(12) United States Patent
Tsai

(10) Patent No.: US 9,560,473 B2
(45) Date of Patent: Jan. 31, 2017

(54) DATA TRANSMISSION SYSTEM

(71) Applicant: Hsiung-Kuang Tsai, Taipei (TW)

(72) Inventor: Hsiung-Kuang Tsai, Taipei (TW)

(*) Notice: Subject to any disclaimer, the term of this patent is extended or adjusted under 35 U.S.C. 154(b) by 0 days.

(21) Appl. No.: 14/438,849

(22) PCT Filed: Oct. 29, 2012

(86) PCT No.: PCT/CN2012/083679
§ 371 (c)(1),
(2) Date: Apr. 27, 2015

(87) PCT Pub. No.: WO2014/067045
PCT Pub. Date: May 8, 2014

(65) Prior Publication Data
US 2015/0289083 A1 Oct. 8, 2015

(51) Int. Cl.
*H04M 1/00* (2006.01)
*H04W 4/00* (2009.01)
*H04B 5/00* (2006.01)
*H04L 29/06* (2006.01)
*H04B 1/38* (2015.01)

(52) U.S. Cl.
CPC ............. *H04W 4/008* (2013.01); *H04B 5/00* (2013.01); *H04L 69/22* (2013.01)

(58) Field of Classification Search
CPC ....... H04B 5/0031; G06F 13/38; H04W 4/008
USPC ........................................................ 455/566
See application file for complete search history.

(56) References Cited

U.S. PATENT DOCUMENTS

| | | | |
|---|---|---|---|
| 8,994,630 B2* | 3/2015 | Pak | G09G 3/3648 345/690 |
| 2005/0243044 A1* | 11/2005 | Kang | G02F 1/136286 345/87 |
| 2008/0082442 A1 | 4/2008 | Chon | |
| 2009/0167699 A1 | 7/2009 | Rosenblatt et al. | |
| 2010/0079416 A1 | 4/2010 | Chung et al. | |
| 2010/0255786 A1* | 10/2010 | Hebiguchi | H04B 13/005 455/41.2 |

FOREIGN PATENT DOCUMENTS

| | | |
|---|---|---|
| CN | 101056328 A | 10/2007 |
| CN | 102130903 A | 7/2011 |
| JP | H 06318136 | 11/1994 |
| JP | 2002112280 | 4/2002 |
| JP | 2004127272 | 4/2004 |
| TW | 200937930 A | 9/2009 |
| WO | WO 2011/155939 | 12/2011 |

* cited by examiner

*Primary Examiner* — Eugene Yun
(74) *Attorney, Agent, or Firm* — Muncy, Geissler, Olds & Lowe, P.C.

(57) ABSTRACT

A data transmission system includes a visual interface device and an operation device. The visual interface device includes a display panel and a control unit. The control unit receives display data and transmission data, and transmits the display data and the transmission data to the display panel. The operation device includes a capturing unit. A coupling signal containing the display data and the transmission data is coupled from an electrode of the display panel to the operation device when the visual interface unit is in operation, and the operation device utilizes the capturing unit to retrieve the transmission signal from the coupling signal.

16 Claims, 2 Drawing Sheets

DATA TRANSMISSION SYSTEM

BACKGROUND OF THE INVENTION

Field of Invention

The invention relates to a data transmission system.

Related Art

In recent years, for increasing the applications of consumer electronic devices, some companies add the near field communication (NFC) (or short range wireless communication) function into an electronic device. Commands, music, pictures, business card, data or files can be transmitted from one electronic device to another electronic device without establishing a physical connection by the NFC (or near wireless communication). Except providing convenient data transmission between electronic devices, it also enable the application of electronic device in more areas, such as access control system, tickets, credit card payment, or receiving advertising messages, such as receiving coupons form store's screen via Bluetooth communication.

It is an inevitable trend for an electronic device to be equipped with near field communication function. Therefore, communication industries actively research and develop to provide an electronic device with a new structure near field communication function.

SUMMARY OF THE INVENTION

The present invention aims at providing a new architecture for data transmission system. The system can process the display data and the transmission data and then transmit to the display panel of a visual interface device. The visual interface device can not only display image but also transmit the transmission data, like data or files, to another electronic device which is equipped with an extracting mechanism for retrieving the transmission data. Accordingly, the application of electronic apparatus can be expanded by achieving such wireless transmission function.

The present invention can be implemented by following technical solutions.

A data transmission system includes a visual interface device and an operation device. The visual interface device includes a display panel and a control unit. The control unit receives display data and transmission data, and transmits to the display panel. The operation device includes an extracting unit. A coupling signal containing the display data and the transmission data is coupled from an electrode of the display panel to the operation device when the operation device is operating on the visual interface device, and, by the extracting unit, the operation device retrieves the transmission data from the coupling signal.

In one embodiment, the coupling signal includes at least one tag, and the operation device retrieves the transmission data according to the tag.

In one embodiment, the tag specifies at least one of the following items of the transmission data, the start, the end, or the length of data.

In one embodiment, the tag specifies at least one of the following items of the display data, the start, the end or the length of data.

In one embodiment, the tag includes at least one of the following items, the identification information of the visual interface device, the identification information of the operation device, or an error-correcting code.

In one embodiment, the display data and the transmission data with the tag differs in the signal format such as amplitude, frequency, phase, time, pulse width or data type.

In one embodiment, the extracting unit retrieves the transmission data in frequency domain, time domain, phase or amplitude.

In one embodiment, the control unit adds a tag to the display data and/or an additional tag to the transmission data, and the extracting unit distinguishes the display data and the transmission data according to the tag and/or the additional tag.

In summary, in the data transmission system of the present invention, when the operation device operates on the visual interface device, a coupling signal that includes the display data and the transmission data is coupled to the operation device from an electrode of the display panel. The operation device can retrieve the transmission data from the coupling signal via the extracting unit. With this method, the visual interface device not only can display image but also transmit the coupling signal that includes the display data and the transmission data to the operation device via wireless coupling. The operation device can retrieve the transmission data TD via the extracting unit. Thus, based on this wireless transmission, the data transmission system of the present invention can expand the applications of electronic devices.

DETAILED DESCRIPTION OF THE INVENTION

A wireless transmission system according to a preferred embodiment of the present invention will be apparent from the following detailed description, which proceeds with reference to the accompanying drawings, wherein the same references relate to the same elements.

Figure 1:
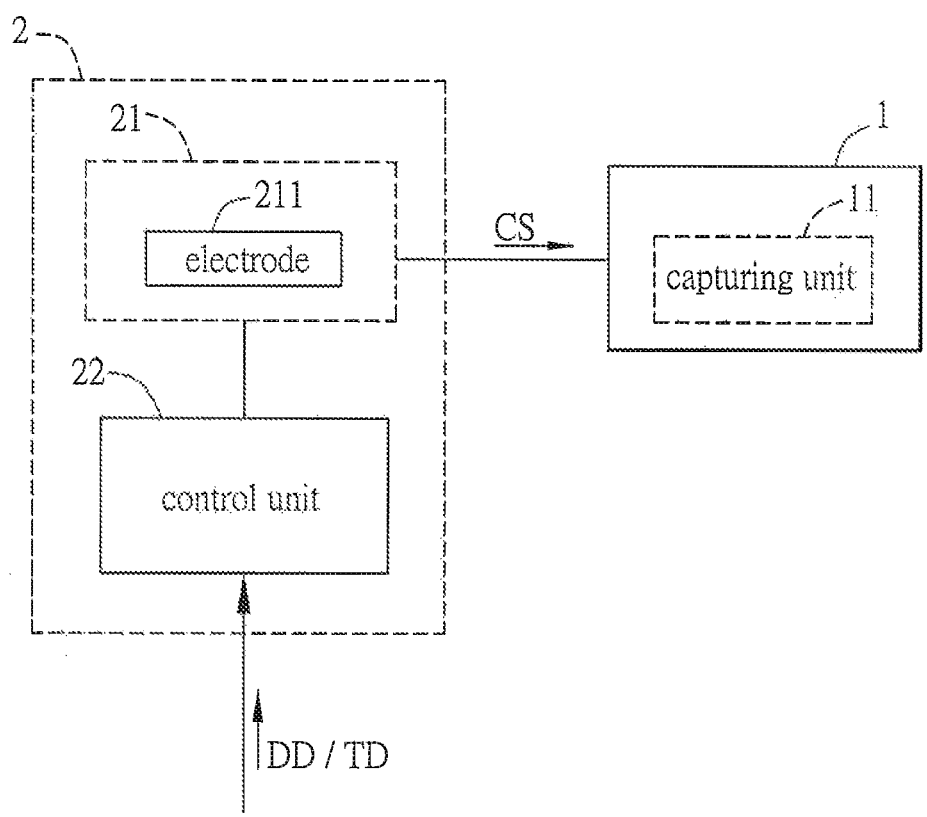
FIG. 1 is a function block diagram of a data transmission system according to an embodiment of the present invention.

Referring to FIG. 1, FIG. 1 is a function block diagram of a data transmission system according to a preferred embodiment of the present invention.

As shown in FIG. 1, the data transmission system includes an operation device 1, a visual interface device 2. The operation device 1 is coupled to the visual interface device 2, for instance, coupled electrically by electromagnetic coupling (e.g., capacitive or inductive) so that data or files can be transmitted without wired connection and is a way to transmit data or file in wireless manner.

The operation device 1 can be a receiving device (e.g., card reader or access system) or an integrated circuit (IC) card, a mobile phone, a public information device, a point of sales device (POS device), an electronic device with another visual interface display, or an electronic device for other specific function. Additionally, the visual interface device 2 can be a mobile phone, a computer (tablet or notebook), a public display, a billboard, an electronic whiteboard, a personal digital assistant or a combination of the above. Additionally, the operation device 1 and the visual interface device 2 can include a processing control system, a storage system or a transmission system, respectively. The system can be a piece of hardware, software program, firmware or a combination of the above.

The visual interface device 2 includes a display panel 21 and a control unit 22. The operation device 1 includes an extracting unit 11.

The display panel 21 includes at least one electrode 211. The display panel 21 includes a pixel matrix which can be an active matrix or a passive matrix. In the embodiment, the display panel 21 is an active matrix type panel, such as liquid crystal (LC) panel, organic light emitting diode (OLED) panel, light emitting diodes (LEDs) panel, Electrophoretic display panel, touch display panel or Micro Electro Mechanical Systems (MEMS) display panel. As an example, when the display panel 21 is a liquid crystal panel, the pixel matrix of the display panel 21 includes, crisscross, a plurality of column electrodes, a plurality of row electrodes, and a plurality of pixel electrodes (not shown in figures). Additionally, the display panel 21 further includes a plurality of transistors (not shown in figures). The transistors are electrically connected to the row electrodes, column electrodes and the pixel electrodes. The row electrodes are the plural scan lines and the column electrodes are the plural data lines or they can be arranged reversely that row electrodes are the plural data lines and column electrodes are the plural scan lines. The electrode 211 can be at least one of the column or row electrodes, or electrode (can be a single electrode or multiple electrodes) that locates outside the pixel matrix and is independent of the pixel matrix, which is not limited.

The control unit 22 can include a core control unit of the visual interface device 2. For instance, the control unit includes at least a central processing unit (CPU) and a memory, or other hardware control units, software or firmware programs. Additionally, the control unit 22 further includes a driving unit (not shown in FIG. 1). The driving unit includes a driving circuit of the display panel 21. The driving unit, for example for driving the liquid crystal display panel, includes a timing controller circuit (T-con circuit), a data driver and a scan driver. The driving unit can comprise one or plural independent integrated circuits, such as driver ICs, that are electrically connected to the display panel 21, or it can be partly separated from the display panel 21 and partly integrated on the display panel 21, or fully integrated on the display panel 21 (driver on panel), which is not limited. Here the integrated or independent stands that the driving unit shares the same substrate with display panel or not.

The control unit 22 can transmit display data DD and transmission data TD to the display panel 21. The display panel 21 is driven by the display data DD and the transmission data TD via the driving unit. When the operation device 1 approaches or operates on the display panel 21, signals can be coupled to the operation device 1. In order for the operation device 1 to distinguish the display data DD and the transmission data TD, the control unit 22 should process the display data DD and the transmission data TD in advance. The processing actions of the control unit 22 includes modulation, series-to-parallel conversion, encoding, adding header information (includes data size, checking code, serial number, tracking data) or other processing actions. The display data DD and the transmission data TD can be generated via internal commands or external commands of the visual interface device 2 and the origins of data are not limited to be obtained from the memory of the visual interface 2 or transmitted from an outside device. The display data DD is the grey scale data of image frames and scanning signals of the display panel 21. The transmission data TD can be a digital data stream or a digital file stream, such as touching information, command information, identification information, promotion information, transaction information, advertising information, file information or other information.

Distinct from the transmission mode in a general communication, the present invention can use different electrodes on the display panel 21 as transmitters simultaneously (multiple communication channels) for transmission. When data is transmitted simultaneously through these communication channels, the interferences between these channels can be reduced via spatial separation or different modulation techniques. It should be noted that the series-to-parallel conversion of data can be in sequential or staggered order or a combination of those. Here the display data DD and the transmission data TD only stand for the two different purposes data being transmitted to the display panel 21, but not represent the signals of the display data DD and the transmission data TD. For example, in liquid crystal display panel, the display data DD includes a plurality of scan signals and a plurality of data signals, for displaying images. The signals of the transmission data TD can be a signal that separates from the scan signals or data signals, or combined with the scan signals of the display data DD, or combined with the data signals of the display data DD.

Take the data lines for example, they not only can transmit the usual data signals of image frames (display data DD), but also can transmit the transmission data TD. For example, the transmission data TD can be converted into a signal with frequency higher than the frequency of the data signal (display data DD) and transmitted by directly superimposed on the signal of the display data DD, or interspersed between the display data, such as transmitting transmission data TD in the time interval between two image frames (the blanking time between two frames), or in the time after completing the scanning one line but before starting the scanning of next line, or within the scanning time of each line by shortening the time for display data and transmitting before display data DD.

Figure 2:
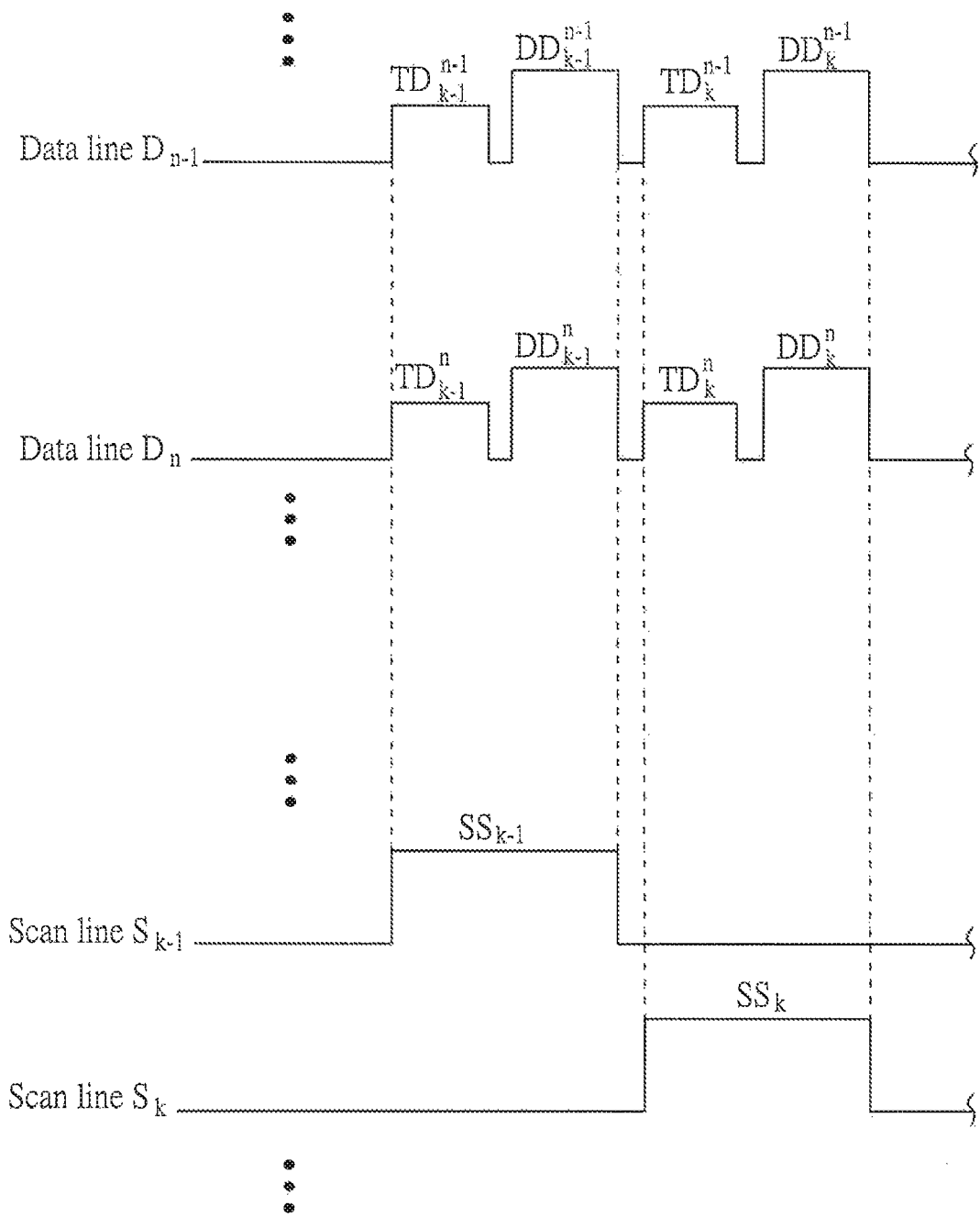
FIG. 2 is a signal diagram of two neighboring scan lines (two neighboring row electrodes) and two neighboring data line (two neighboring column electrodes) of a liquid crystal display.

FIG. 2 is a schematic diagram showing the signals of two neighboring scan lines (row electrodes) and two neighboring data lines (column electrodes) of a liquid crystal display. Here, for example, each row of the transistors is turned on for simultaneous displaying and transmitting the transmission data TD. However, it should be noted that it is not necessary to turn on the transistors for transmitting the transmission data TD, and the transmission data TD can be transmitted while the transistors are turned off. As shown in FIG. 2, the scan lines can separately transmit scanning signals and sequentially turn on each row of transistors. During the time when each row of transistors is turned on, the data lines can respectively transmit the transmission data TD and the display data DD (the grey scale data).

In the embodiment, when the scan line $S_{k-1}$ transmits scanning signal $SS_{k-1}$, all the data lines transmit a transmission data $TD_{k-1}$ (the transmission data for individual data line is represented as $TD^{n-1}_{k-1}$, $TD^{n}_{k-1}$, respectively); when the scan line $S_k$ transmits scanning signal $SS_k$, all the data lines transmit a transmission data $TD_k$ (the transmission data for individual data line is represented as $TD^{n-1}_{k}$, $TD^{n}_{k}$, respectively). In FIG. 2, the transmission data $TD_{k-1}$, $TD_k$ (represented as $TD^{n-1}_{k-1}$, $TD^{n}_{k-1}$, $TD^{n-1}_{k}$ and $TD^{n}_{k}$, respectively) and the display data $DD_{k-1}$, $DD_k$ (represented as $DD^{n-1}_{k-1}$, $DD^{n}_{k-1}$, $DD^{n-1}_{k}$ and $DD^{n}_{k}$, respectively) are marked by different voltage levels. When it is implemented, they can use the same voltage level or other characters can be used. Therefore, the data lines can respectively transmit the transmission data TD when scan lines transmit the scanning signals.

A supplement is that the transmission data $TD^{n-1}_{k-1}$, $TD^{n}_{k-1}$, $TD^{n-1}_{k}$, $TD^{n}_{k}$ are represented by a high voltage level for "1", but they can also be a low voltage level for "0". Additionally, an AC signal (that is without DC component) can be used for the transmission data $TD^{n-1}_{k-1}$, $TD^{n}_{k-1}$, $TD^{n-1}_{k}$, $TD^{n}_{k}$ to prevent the problem caused by signal polarity.

In the above description, the "1" and "0" of digital signal are represented by the "high" and "low" level of signal amplitude. However, the "1" and "0" can also be represented by the frequency. For instance, 5 high-low cycles change in amplitude within a unit of time represents "1" and other amplitude change cycles represents "0"; or represent "1" and "0" by the phase, such as a high level and a low level represents "0", and a low level and a high level represents "1". The representation of "1" and "0" of the digital signal are not limited to above descriptions. In addition, for preventing the interferences from the neighboring electrodes, the techniques such as time division, frequency division, or code division can be applied between the electrodes.

Additionally, the transmission data TD can be transmitted via the scan lines, for example, the transmission data TD can be converted into a signal with a voltage level that cannot turn on the pixel transistors, or transmitted via an electrode that is neither data line nor scan line (e.g., transmitted via a stand-alone electrode), or transmitted simultaneously by the data lines and scan lines to increase the transmission speed, or converted into two signals (e.g., a positive signal and a negative signal) and sent to two different electrodes (such as data lines or scan lines) to reduce the signal amplitude. Additionally, when the transmission data TD is transmitted via the row electrodes or the column electrodes of the pixel matrix of the display panel 21, the transmission data TD and the display data DD can be transmitted separately at different times. For instance, the transmission data TD can be transmitted after an image frame is transmitted or before transmitting an image frame. In other words, the visual interface device 2 can transmit the coupling signal CS to the operation device 1 after one image frame is displayed and before displaying the next image frame, or during the period when displaying an image frame. It should be noted that when the transmission data TD is transmitted via a stand-alone electrode separate from the pixel matrix, it is not necessary to coordinate the transmission data TD with the transmission of image frame.

Referring to FIG. 1 again, when the operation device 1 operates on the visual interface device 2, a coupling signal CS containing the display data DD and the transmission data TD is coupled (capacitive coupling or inductive coupling) to the operation device 1 via the electrodes of the display panel 21. When the coupling signal CS is received by the operation device 1, the transmission data TD can be retrieved from the coupling signal CS by the extracting unit 11 to complete the data or file transmission. The coupling can transmit the digital information (0 or 1) in wireless manner from the visual interface device 2 to the operation device 1. When the coupling signal CS from the display panel 21 is received by the operation device 1, the operation device 1 can obtain the transmission data TD by processing the coupling signal CS. The way of signal receiving is by approaching or contacting the operation device 1 with the display surface of the display panel 21 of visual interface device 2 so that the coupling signal CS can be coupled to operation device 1 by electromagnetic effect.

To assist the retrieval of transmission data TD from coupling signal CS by the extracting unit 11 of operation device 1, the control unit 22 adds at least one tag in the display data DD and/or the transmission data TD so that the extracting unit 11 of operation device 1 can recognize and retrieve the transmission data TD from the coupling signal CS according to this tag. In other words, the control unit 22 can add one tag only to the display data DD so that the extracting 11 can retrieve the transmission data TD by recognizing the display data DD; or the control unit 22 can add one tag to the transmission data TD so that the extracting unit 11 can retrieve the transmission data TD by recognizing the transmission data TD; or the control unit 22 can add different tags to the display data DD and transmission data TD separately so that the extracting unit 11 can retrieve the transmission data TD by recognizing the display data DD and transmission data TD from respective tags. The tag added by the control unit 22 may contain at least one transmission tag or at least one data tag (transmission tag or data tag, at least one should be included in the tag added by the control unit 22). The transmission tag indicates applying different modulation methods to process the display data DD and transmission data TD, for example, using frequency, amplitude, or phase different from the display data DD to transmit transmission data TD; data tag indicates adding a specific tag into the data to mark, for example the transmission data TD, starting point, ending point or the information such as data length so that, from the coupling signal, the extracting unit 11 can separate which part is the display data DD for displaying and which part is the transmission data TD for communication. For instance, the data tag can mark the starting point, ending point (it will suffice to know the starting for fixed data length), data length of the display data DD, or the starting point, ending point (it will suffice to know the starting for fixed data length), data length of the transmission data TD. Additionally, the tag can include an identification information of the visual interface device 2 (e.g., brand, serial number, device nickname), an identification information of the operation device 1, an error-correcting code (for example the checksum of the data for verifying whether the data is damage during transmission and requiring retransmission if any error is found) or a combination of those. Thus, the extracting unit 11 can retrieve the transmission TD according to the tag. When tagged, the transmission data TD and display data DD may be distinct from the difference in signal amplitude, frequency, phase, time, pulse width, or data format.

For instance, the data transmission system of the present invention can utilize different frequencies (for example the modulation frequency of the transmission data TD is four times the scanning frequency of scan lines of the display data DD), amplitudes, or phases (such as, for continuous image frames, the polarity of the display data DD is inverted and the polarity of transmission data TD is not inverted) to transmit the display data DD and the transmission data TD. Then the transmission data can be retrieved by the extracting unit 11 of the operation device 1 according to above characters of transmission tag. Or, utilizing the specific amplitude, frequency, pulse width, or particular codes that appear within a time interval to distinguish the location of display data DD and transmission data TD. For instance, use an extra high amplitude signal to mark the starting point (or a signal for synchronization) of display data DD or transmission data TD, so that extracting unit 11 can identify and retrieve. Or, by data tag, that the extracting unit 11 can identify and retrieve the transmission data TD according to the magnitude of the amplitude, signal frequency (for example a specific frequency signal that is different from the display data DD appears or not), location of time interval (for example TD is transmitted after every image frame of DD or transmitted between the scanning time of two scan lines), pulse width (for example the pulse width of TD is ½ of the scanning time of DD), or a particular code (for example TD starts with a digital data [010] that each data bit width is only ⅓ of the scanning time). The tag of the present invention can further include the information such as, receiver, sender, data size or error-correcting codes, to assist the identification or judging the correctness of transmission data TD.

Therefore, when user holds the operation device 1 and operates on the display panel 21 of the visual interface device 2 (e.g., approaching or contacting the display panel 21), the coupling signal CS is coupled to the operation device 1 from the display surface of display panel 21 via capacitive or inductive coupling and the transmission data TD can be retrieved by the extracting unit 11. For instance, the operation device 1 is an access control unit and when the display panel 21 of the visual interface device 2 approaches the operation device 1, the operation device 1 can receive the information to accept or refuse the access and issue the "LOCK" or "UNLOCK" action. Or, when the visual interface device 2 is a public information display and the operation device 1 is a mobile phone or other personal device, by approaching the operation device 1 to the display panel of the visual interface device 2, the information such as advertising information, promotional information, or geographic information can be transmitted to the operation device 1 and taken by the user.

In summary, in the data transmission system of the present invention, when the operation device operates on the visual interface device, a coupling signal that includes the display data and the transmission data is coupled to the operation device from an electrode of the display panel. The operation device can retrieve the transmission data from the coupling signal via the extracting unit. With this method, the visual interface device not only can display image but also transmit the coupling signal that includes the display data and the transmission data to the operation device via wireless coupling. The operation device can retrieve the transmission data TD via the extracting unit. Thus, based on this wireless transmission, the data transmission system of the present invention can expand the applications of electronic devices.

Although the invention has been described with reference to specific embodiments, this is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data transmission system comprising:
 a visual interface device comprising a display panel and a control unit, wherein the display panel includes a pixel matrix including plural pixel electrodes, row electrodes and column electrodes, the control unit receives display data and transmission data, and transmits the display data and the transmission data to at least one of the row electrodes or the column electrodes of the pixel matrix of the display panel, the display data and the transmission data are different data; and
 an operation device comprising an extracting unit, wherein the operation device and the visual interface device are located separately from each other;
 wherein a coupling signal containing the display data and the transmission data is wirelessly coupled from the at least one of the row electrodes or the column electrodes of the pixel matrix of the display panel to the operation device when the operation device operates on the visual interface device, and the operation device retrieves the transmission data from the coupling signal by the extracting unit.

2. The data transmission system of claim 1 wherein the coupling signal comprises at least one tag and the operation device retrieves the transmission data according to the tag.

3. The data transmission system of claim 2 wherein the tag indicates, at least one of, the starting point, the endpoint, or the data size of the transmission data.

4. The data transmission system of claim 2 wherein the tag indicates, at least one of, the starting point, the endpoint, or the data size of the display data.

5. The data transmission system of claim 2 wherein the tag comprises, at least one of, an identification information of the visual interface device, an identification information of the operation device, or an error-correcting code.

6. The data transmission system of claim 2 wherein the signal between the display data and the transmission data with the tag has different characteristics in amplitude, frequency, phase, time, pulse width or data format.

7. The data transmission system of claim 1 wherein the extracting unit retrieves the transmission data according to the frequency range, time range, phase or amplitude.

8. The data transmission system of claim 1, wherein the control unit adds a tag into the display data and/or adds an additional tag into the transmission data, and the extracting unit distinguishes the display data and the transmission data according to the tag and/or the additional tag.

9. An operation device, adapted for being wirelessly coupled to a display panel wherein the display panel is located separately from the operation device and comprises a pixel matrix including plural pixel electrodes, row electrodes and column electrodes, comprising:
 a coupling unit, wirelessly coupled to a signal transmitted from at least one of the row electrodes or the column electrodes of the pixel matrix of the display panel, wherein the signal carries display data and transmission data for the operation device and the display data and the transmission data are different data; and
 an extracting unit, retrieving the transmission data from the coupled signal.

10. The operation device of claim 9, wherein the signal comprises at least one tag, and the operation device retrieves the transmission data according to the tag.

11. The operation device of claim 10, wherein the tag indicates, at least one of, the starting point, the endpoint, or the data size of the transmission data.

12. The operation device of claim 10, wherein the tag indicates, at least one of, the starting point, the endpoint, or the data size of the display data.

13. The operation device of claim 10, wherein the tag comprises, at least one of, an identification information of the visual interface device, an identification information of the operation device, or an error-correcting code.

14. The operation device of claim 10, wherein the signal between the display data and the transmission data with the tag has different characteristics in amplitude, frequency, phase, time, pulse width or data format.

15. The operation device of claim 9, wherein the extracting unit retrieves the transmission data according to the frequency range, time range, phase or amplitude of the coupled signal.

16. The operation device of claim 9, wherein the display data is added with a tag and/or the transmission data is added with an additional tag, and the extracting unit distinguishes the display data and the transmission data according to the tag and/or the additional tag.

\* \* \* \* \*